Patented Dec. 25, 1951

2,579,668

UNITED STATES PATENT OFFICE 2,579,668

PREPARATION OF THYROXINE AND ITS DERIVATIVES

Benjamin Arthur Hems, Northolt, and John Charles Clayton, Southall, England, assignors to Glaxo Laboratories Limited, Greenford, Middlesex, England, a British company No Drawing. Application July 11, 1949, Serial No. 104,146. In Great Britain December 31, 1948

10 Claims. (Cl. 260—471)

This invention is concerned with improvements in or relating to the preparation of thyroxine and its derivatives.

The preparation of thyroxine by the iodination of 3:5-diiodothyronine using iodine in concentrated aqueous ammonia solution has been described but this method of preparation is hazardous due to the risk of formation of nitrogen triiodide. One of the objects of this invention is to overcome this difficulty.

We have now found that thyroxine and its derivatives may be conveniently prepared by the iodination of 3:5-diiodothyronine or an appropriate derivative thereof in the presence of a suitable base as hereinafter defined.

By the term "thyroxine and its derivatives" we mean compounds of the general formula:

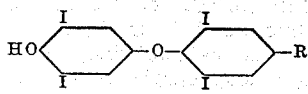

where R is

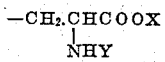

or

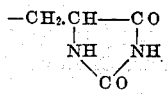

X being hydrogen, or a methyl or ethyl group and Y being hydrogen, or a formyl, acetyl or β-carboxypropionyl group.

The term "a suitable organic base" as used herein means a primary or secondary aliphatic amine which may contain a cyclohexyl or alkylcyclohexyl group and which may contain one or two hydroxyl groups, piperidine, a C-alkylpiperidine or morpholine, the base in every case having not more than eight carbon atoms. Examples of preferred bases are methylamine, ethylamine, butylamine, ethylene diamine, dimethylamine, dibutylamine, monoethanolamine and diethanolamine.

According to the invention therefore we provide a process for the preparation of compounds of the general formula

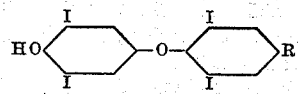

in which a compound of the general formula

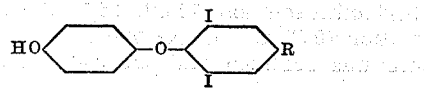

is reacted with iodine in a suitable solvent in the presence of a suitable organic base both as herein defined where R has the above stated meaning.

As "suitable solvent" we may use water, dioxan or a lower aliphatic alcohol, for example methanol or ethanol, or mixtures of these substances. The solvent should preferably, but not necessarily, be chosen so that the diiodothyronine or its derivative is soluble in the solution of the suitable base in the solvent or solvent mixture used; in general we have found that water is the preferred solvent.

We have found further that the process according to the invention may conveniently be carried out in the presence of hydrogen peroxide, in which case the quantity of iodine required is reduced by half due to the oxidation of the hydrogen iodide produced to iodine.

According to a further feature of the invention therefore the reaction is carried out in the presence of hydrogen peroxide.

The iodine may for example be conveniently added in solid form, in solution in aqueous potassium iodide solution or in solution in one of the suitable solvents. Normally two molecular proportions of iodine, i. e., two moles of iodine per mole of 3:5-diiodothyronine or its derivatives as defined herein, are required for the purpose of the present process, but where hydrogen peroxide is used one molecular proportion is sufficient.

The reaction may for example be carried out at temperatures of from 0° to 50° C. preferably at room temperature.

Where the group R is the group

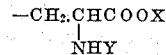

which group contains an asymmetric carbon atom, we have found that the use of optically active starting material leads to the formation of an optically active product. This fact is of use in the synthesis of L-thyroxine which compound is of greater physiological activity than D-thyroxine.

In order that the invention may be well understood the following examples are given only as illustrations:

EXAMPLE 1

(a) *Iodination of 3:5 - diiodothyronine in methylamine solution.*—To a stirred solution of 3:5-diiodothyronine (2 g.) in aqueous methylamine solution 20 ml., 20%, a solution of iodine in potassium iodide solution (8.2 ml.; 1.85 N; 4 equivalents) was added dropwise. The uptake of iodine was rapid and at the end of the addition the mixture was stirred for ten minutes and then acidified with glacial acetic acid. The precipitated thyroxine was filtered off and redissolved in ethyl alcohol (20 ml.) and sodium hydroxide solution (10 ml., 2 N). After charcoaling and filtering, the boiling solution was acidified with acetic acid when the thyroxine deposited as a white microcrystalline powder M. P. and mixed M. P. 231–232° C. (dec.) 2.6 g., 90%.

In the same way aqueous solutions of ethylamine, butylamine, ethylene diamine and dimethylamine were employed, the yields of thyroxine varying from 70–90%.

(b) Iodination of 3:5-diiodothyronine using other bases was carried out as follows:

(1) Using morpholine.—To a suspension of finely divided 3:5-diiodo-thyronine (0.5 g.) in 50% aqueous morpholine solution (25 ml.) a solution of iodine in potassium iodide solution (2 ml. 1.9 N) was added dropwise with stirring. All the material slowly went into solution and the brown iodine colour rapidly disappeared. After 15 minutes 20% hydrochloric acid was added until the solution was acid to Congo paper and the pH readjusted to 4–5 by addition of a saturated solution of sodium acetate. The precipitated thyroxine was filtered off and recrystallised with charcoaling by solution in alcoholic sodium hydroxide solution and addition of acetic acid (0.5 g.) M. P. and mixed M. P. 233° C. (dec.).

(2) Using piperidine.—3:5 - diiodothyronine (0.5 g) was iodinated exactly as above, but 50% piperidine solution (25 ml.) was employed. Thyroxine (0.5 g.) M. P. 233–234° C. (dec.) was obtained as a white powder.

(3) Using monoethanolamine.—To a stirred suspension of 3:5-diiodothyronine (0.5 g.) in 50% aqueous ethanolamine solution (25 ml.) 1.9 N-iodine solution (2 ml.) was added dropwise. The solid slowly went into solution and after 15 minutes the solution was acidified with glacial acetic acid to precipitate thyroxine which was recrystallised as above M. P. 233° C. (dec.) (0.5 g.).

(4) Using diethanolamine.—This base was used exactly as monoethanolamine above to yield thyroxine M. P. 233° C. (dec.) (0.55 g.).

(5) Using dibutylamine in ethyl alcohol.—To a stirred suspension of 3:5 - diiodothyronine (0.5 g.) in dibutylamine (1 ml.) and ethyl alcohol (14 ml.) iodine solution (2 ml.; 1.9 N) was added. The uptake of iodine was slow, and after two hours the solution was acidified with glacial acetic acid and water added to precipitate the thyroxine, which was recrystallised in the usual manner, M. P. 228–229° C. (dec.) (0.4 g.).

EXAMPLE 2

(a) Iodination of 3:5-diiodothyronine in a solution of the base in aqueous solvent.—To a stirred solution of 3:5-diiodothyronine (1 g.) in a mixture of aqueous methylamine (10 ml., 20%) and methyl alcohol (10 ml.) a solution of iodine in potassium iodide solution (4.1 ml.; 1.85 N; 4 equivalents) was added dropwise. At the end of the addition an equal volume of water was added to the mixture and the thyroxine precipitated by addition of acetic acid. It was recrystallised as above to yield thyroxine as a white solid; M. P. and mixed M. P. 231–232° C. (dec.) (0.9 g., 61%). Similarly the iodination was carried out in solutions of aqueous methylamine and ethyl alcohol n-propyl alcohol, n-butyl alcohol and dioxan.

(b) Iodination under anhydrous conditions.—To a solution of 3:5-diiodothyronine (0.1 g.) in a solution of n-butylamine in ethyl alcohol (10 ml., 20%) alcoholic iodine solution (0.4 ml.; 1.9 N) was added dropwise. The uptake was slow but definite. At the end of the addition the mixture was diluted with an equal volume of water, acidified and worked up as above to yield thyroxine, M. P. and mixed M. P. 232° C. (dec.) (0.07 g. 47%).

(c) Iodination under oxidising conditions.—To a solution of 3:5-diiodothyronine (0.5 g.) in an aqueous solution of methylamine (10 ml. 20%), a solution of iodine in potassium iodide solution (1.02 ml., 1.85 N, 2 equivalents) was added dropwise with stirring. Hydrogen peroxide solution (1 ml., 100 vol.) was added and after 10 minutes standing the mixture was worked up as above to yield thyroxine, M. P. and mixed M. P. 230–232° C. (dec.) (0.5 g. 70%).

(d) Iodination with alcoholic iodine.—This experiment was carried out exactly like the first experiment save that the iodine (4 equivalents) was added in alcoholic solution. The yield of thyroxine was 65%.

EXAMPLE 3

Thyroxine hydantoin: To a stirred solution of 5-(3':5'-diiodo-4'-p-hydroxyphenoxybenzyl) hydantoin (0.55 g.) in aqueous methylamine solution (20 ml. 20%) iodine solution (2.1 ml. 1.9 N) was added dropwise. After ten minutes the mixture was acidified and the solid crystallised from glacial acetic acid as tiny white prisms M. P. softens at 169–170° C. decomposing with evolution of iodine at 235° C. upwards. Analysis identified it as 5-(3':5'-diiodo-4'-p-hydroxy-m:m-diiodophenoxybenzyl) hydantoin solvated with one molecule of acetic acid. (Found: C, 25.4; H, 1.6; N, 3.4%, $C_{16}H_{10}O_4N_2I_4CH_3COOH$ requires: C, 25.1; H, 1.6; N, 3.25%). The starting material, 5(3':5'-diiodo-4'-hydroxyphenoxybenzyl) hydantoin may be prepared in the same manner as the initial products of the other examples, for example by the method described by Borrows et al., Jour. Chemical Society, London, 1949, page 199.

EXAMPLE 4

(a) 3:5-diiodo-N-acetyl thyronine.—To a solution of 3:5-diiodothyronine methyl ester (1 g.) in anisole (30 ml.) a solution of acetyl chloride (0.072 g.) in anisole (2 ml.) was added. After standing the precipitate was filtered off and identified by M. P. and mixed M. P. 227° C. (dec.), as 3:5-diiodothyronine methyl ester hydrochloride (0.54 g.). The filtrate was evaporated to dryness in vacuo and the residue dissolved in ethyl alcohol (5 ml.) and N-sodium hydroxide solution (5 ml.). After standing one hour to hydrolyse the ester group, N-hydrochloric acid (5 ml.) and water (30 ml.) were added to precipitate a white solid which was recrystallised from glacial acetic acid as white prisms M. P. 207–208° C. (0.35 g.). (Found: C. 36.0; H, 2.65; N, 2.2; I, 44.8%. $C_{17}H_{15}O_5NI_2$ requires, C, 36.15; H, 3.0; N, 2.5; I, 44.9%.)

(b) N-acetylthyroxine.—To a solution of 3:5-diiodo-N-acetyl thyronine (0.1 g.) in aqueous ethylamine solution (10 ml.; 20%) aqueous iodine solution (0.37 ml.; 1.9 N) was added. The mixture was acidified and the solid recrystallised from aqueous acetic acid as a white solid M. P. and mixed M. P. 214–215° C. (dec.).

EXAMPLE 5

(a) *3:5-diiodo - N - β - carboxypropionylthyronine*.—To a solution of 3:5-diiodothyronine methyl ester (1 g.) in anisole (20 ml.) a solution of β-carbethoxypropionyl chloride (0.07 g.) in anisole (2 ml.) was added. The precipitated 3:5-diiodothyronine methyl ester hydrochloride was filtered off and the filtrate evaporated to dryness in vacuo. The residue was dissolved in ethyl alcohol (5 ml.) and N sodium hydroxide solution (5 ml.). After one hour N-hydrochloric acid (5 ml.) was added and the solid filtered off. It was dissolved in alcoholic alkali and charcoaled and reprecipitated with acid to give tiny white prisms of 3:5-diiodo-N-β-carboxypropionylthyronine, M. P. 231–232° C. (dec.) (0.3 g.). (Found: C, 34.8; H, 3.1; N, 2.2; I, 41.2%. $C_{19}H_{17}O_7NI_2$ requires C, 36.5; H, 2.7; N, 2.2; I, 40.7%.)

(b) *N - β - carboxypropionyl thyroxine*.—To a stirred solution of 3:5-diiodo-N-β-carboxypropionylthyronine (0.1 g.) in alcoholic ethylamine solution (10 ml., 20%) aqueous iodine solution (0.34 ml., 1.9 N) was added. The solution was diluted and acidified with acetic acid and the precipitate recrystallised from aqueous acetic acid M. P. 202–203° C. (dec.). Found: C, 25.9; H, 1.5; N, 1.4; I, 57.5%; $C_{19}H_{15}O_7NI_4$ requires: C, 26.0; H, 1.7; N, 1.6; I, 58.01%.

EXAMPLE 6

*Preparation of N-formylthyroxine*

To a stirred solution of N-formyl-3:5-diiodothyronine (0.2 g.) in ethylamine solution (10 c. c.; 33% in water), iodine solution (0.79 c. c.; 1.9 N) was added. After 30 minutes the mixture was acidified with 2N-hydrochloric acid and the precipitated N-formylthyroxine recrystallised from aqueous acetone as a white solid M. P. 216° C. (0.15 g.).

EXAMPLE 7

*L-thyroxine*

To a stirred solution of 3:5-diiodo-L-thyronine (22 g.) in aqueous ethylamine (33%; 220 mls.; 40 mols.) a solution of iodine in potassium iodide solution (88 ml.; 1.9 N) was added dropwise. The uptake of iodine was rapid and after all had been added, the ethylamine salt of thyroxine deposited. Whilst stirring and without cooling, hydrochloric acid (16%) was added until the pH was 4–5. After keeping for two hours the precipitated thyroxine was filtered off, washed with water and dissolved in ethyl alcohol (250 ml.) and 2N-sodium hydroxide solution (100 ml.). The solution was heated to boiling and a hot solution of 2N-hydrochloric acid (ca. 100 ml.) was added to adjust the pH to 4–5. Any overacidification was corrected by the addition of a little sodium acetate solution. After keeping for two hours in the refrigerator the thyroxine was filtered off, washed with water and ethyl alcohol and dried at 100° C., M. P. 233–235° C. (dec.) (29 g.; 89%).

$$(\alpha)_D = -5.8°$$

EXAMPLE 8

*Iodination of methyl ester of 3:5-diiodo-DL-thyronine*

To a solution of 3:5-diiodo-DL-thyronine methyl ester (1 g.) in methyl alcohol (20 ml.) and n-butylamine (10 ml.), iodine (1 g.) in methyl alcohol solution (10 ml.) was added slowly. The mixture was stirred for one hour and then a solution of hydrogen chloride in methyl alcohol was added until the solution was acid. The mixture was diluted with water and saturated sodium acetate solution was added to adjust the pH to 4–5. The solid was filtered off and dried, and extracted with a little methyl alcohol to leave a residue of the pure methyl ester of thyroxine M. P. 158–160° C. undepressed with an authentic specimen (0.7 g.). (Found: N, 1.7; I, 64.6. Calc. for $C_{16}H_{13}O_4NI_4$, N, 1.7; I, 64.2%.)

EXAMPLE 9

*Iodination of 3:5-diiodothyronine using cyclohexylamine*

To a solution of 3:5-diiodothyronine (0.5 g.) in cyclohexylamine (7 ml.) and water (14 ml.) a solution of iodine (2 ml. 1.9 N) in potassium iodide was added dropwise with shaking. After keeping for 15 minutes the solution was acidified with acetic acid to precipitate thyroxine which was recrystallised from alcoholic alkali in the usual manner. M. P. 230° (decomp.) (0.5 g.).

We claim:

1. A process for the preparation of compounds of the general formula:

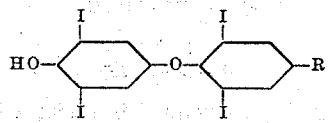

in which a diiodo compound of the general formula

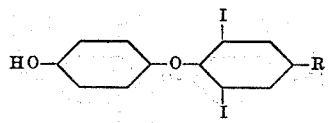

is reacted with iodine in a solvent selected from the group consisting of water, dioxan, lower aliphatic alcohols and mixtures thereof, in the presence of an organic base selected from the group consisting of piperidine, C-alkylpiperidines, morpholine and primary and secondary amines in which the groupings other than hydrogen attached to the nitrogen are selected from the group consisting of unsubstituted and hydroxy-substituted alkyl, cyclohexyl and alkylcyclohexyl groupings, all of said bases containing not more than eight carbon atoms, where R is a grouping selected from the group consisting of

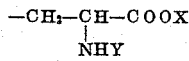

and

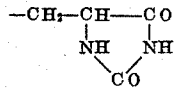

in which X is selected from the group consisting of hydrogen, and methyl and ethyl groupings and Y is selected from the group consisting of hydrogen, and formyl, acetyl and a β-carboxypropionyl groupings.

2. The process as defined in claim 1 in which the reaction is carried out in the presence of hydrogen peroxide.

3. The process as defined in claim 2 in which the reaction is carried out with one mole of iodine per mole of said diiodo compound.

4. The process as defined in claim 1 in which the reaction is carried out with two moles of iodine per mole of said diiodo compound.

5. The process as defined in claim 1 in which the reaction is carried out at a temperature within the range of 0° to 50° C.

6. The process as defined in claim 1 in which a laevo isomer of the compound of the general formula

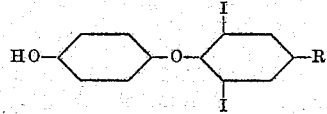

is used in the reaction and in which R is

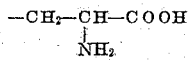

7. The process as defined in claim 1 in which a laevo isomer of the compound of the general formula

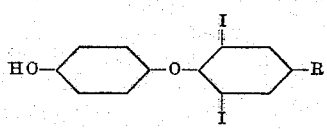

is used in the reaction and in which R is

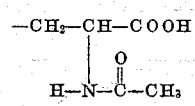

8. The process as defined in claim 1 in which a laevo isomer of the compound of the general formula

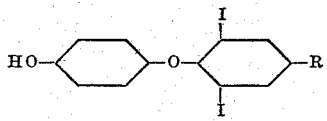

is used in the reaction and in which R is

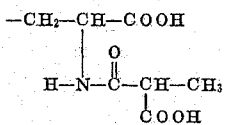

9. The process as defined in claim 1 in which a laevo isomer of the compound of the general formula

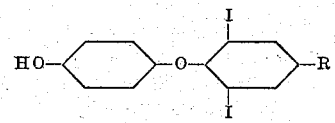

is used in the reaction and in which R is

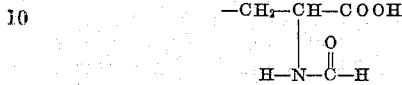

10. The process as defined in claim 1 in which a laevo isomer of the compound of the general formula

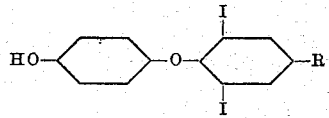

is used in the reaction and in which R is

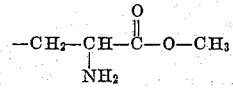

BENJAMIN ARTHUR HEMS.
JOHN CHARLES CLAYTON.

REFERENCES CITED

The following references are of record in the file of this patent:

UNITED STATES PATENTS

| Number | Name | Date |
|---|---|---|
| 2,245,610 | Schaeffer | June 17, 1941 |
| 2,478,065 | Turner | Aug. 2, 1949 |

FOREIGN PATENTS

| Number | Country | Date |
|---|---|---|
| 559,024 | Great Britain | Feb. 1, 1944 |

OTHER REFERENCES

Berichte, vol. 68-A, pp. 1108–1115 (1935).
Harington, Biochemicals Journal, vol. 21 (1927), pp. 169–180.
Harington, J. Chem. Soc. (London) (1944), pp. 193–201.
Ludwig Hoppe, Seyler's Zeitschrift f. physiol Chemie., vol. 258, pp. 195–211.